United States Patent [19]
Horowitz

[11] Patent Number: 5,893,094
[45] Date of Patent: Apr. 6, 1999

[54] METHOD AND APPARATUS USING RUN LENGTH ENCODING TO EVALUATE A DATABASE

[75] Inventor: Michael L. Horowitz, Pittsburgh, Pa.

[73] Assignee: Claritech Corporation, Pittsburgh, Pa.

[21] Appl. No.: 900,562

[22] Filed: Jul. 25, 1997

[51] Int. Cl.[6] .................................................. G06F 17/30
[52] U.S. Cl. ............................ 707/5; 707/3; 707/101; 341/51
[58] Field of Search ................... 707/6, 101, 3; 341/51

[56] References Cited

U.S. PATENT DOCUMENTS

| | | | |
|---|---|---|---|
| 3,995,254 | 11/1976 | Rosenbaum | 382/231 |
| 4,823,306 | 4/1989 | Barbic et al. | 707/5 |
| 5,036,457 | 7/1991 | Glaser et al. | 395/500 |
| 5,140,692 | 8/1992 | Morita | 707/5 |
| 5,191,524 | 3/1993 | Pincus et al. | 600/508 |
| 5,249,262 | 9/1993 | Baule | 706/56 |
| 5,398,199 | 3/1995 | Lefons | 364/735 |
| 5,414,425 | 5/1995 | Whiting et al. | 341/67 |
| 5,469,354 | 11/1995 | Hatakeyama et al. | 707/3 |
| 5,537,586 | 7/1996 | Amram et al. | 707/3 |
| 5,546,575 | 8/1996 | Potter et al. | 707/101 |
| 5,566,192 | 10/1996 | Moon | 371/47.1 |
| 5,619,199 | 4/1997 | Watts et al. | 341/51 |
| 5,629,695 | 5/1997 | Watts et al. | 341/51 |

OTHER PUBLICATIONS

S. Kwong et al., *Using Multiple Huffman Trees for Compressing Chinese Character Fonts*, Paper No. 95–70 (Sep. 6, 1995), p.1–13.

*Data Compression* (internet posting), p. 1–13.

*Primary Examiner*—Paul R. Lintz
*Attorney, Agent, or Firm*—Jones, Day, Reavis & Pogue; Blaney Harper

[57] ABSTRACT

The present invention provides a method and apparatus for generating a database search result. The creation of the search result is achieved by representing the subdocument lists of an inverted database with encoded bit strings. The encoded bit strings are space efficient methods of storing the occurrence correspondence between terms in the database and their occurrence in subdocuments. Logical combinations of these bit strings are then obtained by identifying the intersection, union, and/or inversion of a plurality of the bit strings. Since keywords for a database search can be identified by selecting the terms of the inverted database, the logical combinations of bit strings represent search results over the database. This technique for method for generating a search result is computationally efficient because computers combine bit strings very efficiently. Also, the search elements of the present invention are not just limited to keywords. The search elements also include types of fields (e.g., date or integer fields) or other extracted entities.

8 Claims, 4 Drawing Sheets

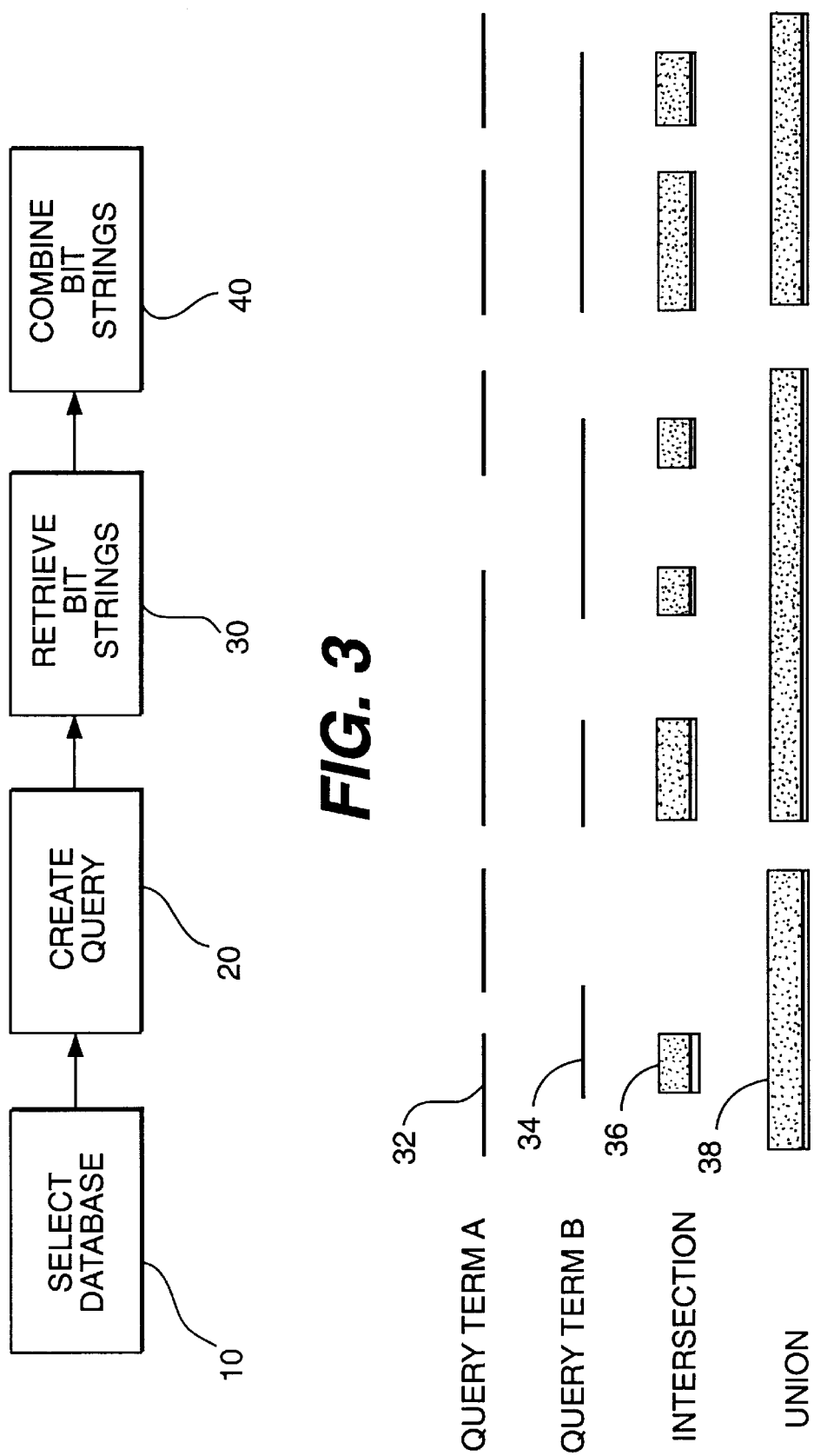

METHOD AND APPARATUS USING RUN LENGTH ENCODING TO EVALUATE A DATABASE

FIELD OF THE INVENTION

This invention relates to the field of computerized information search and retrieval systems and, more particularly, to a method and apparatus for comparing database search results.

BACKGROUND OF THE INVENTION

Information is increasingly being represented as digital bits of data and stored within electronic databases. These databases often include extremely large numbers of records containing data fields reflecting an endless variety of objects. Some databases, for example, contain the full text of judicial opinions issued by every court in the United States for the past one hundred and fifty years. Other databases may be filled with data fields containing particularized information about vast numbers of individuals (e.g., names, addresses, telephone numbers, etc.). As more information is stored in these databases, the larger these data compilations become.

Among the many advantages associated with electronic storage is the fact that any given database can be searched for the purpose of retrieving individual data records (e.g., documents) that may be of particular interest to the user. One of the ways to perform this search is to simply determine which data records, if any, contain a certain keyword. This determination is accomplished by comparing the keyword with each record in the database and assessing whether the keyword is present or absent. In addition, database users can search for data records that contain a variety of keyword combinations (e.g., "cats" and "dogs", etc.). This operation, known as a Boolean search, uses the conjunctions "AND", "OR", and "NOT" (among others) to join keywords in an effort to more precisely define and/or simplify the database search. For example, if a user joins the keywords "cats" and "dogs" with the conjunction "AND" and inputs the query "cats AND dogs", only those records that contain both the term "cats" and the term "dogs" will be retrieved.

The problem with this Boolean search however, is that a computer typically makes use of substantial memory space and computing time to perform logical combinations of sets of documents corresponding to the keyword search results. It is therefore desireable to create a system that performs logical combinations on set elements that is space and computation time efficient.

OBJECTS OF THE INVENTION

It is an object of the present invention to analyze data records in a database.

It is a further object of the present invention to analyze data records in a database by efficiently representing the results of element tests against the database.

It is another object of the present invention to analyze data records in a database by efficiently combining the results of element tests against the database.

It is still a further object of the present invention to analyze data records in a database by efficiently representing the results of keyword tests against the database.

It is still a further object of the present invention to analyze data records in a database by efficiently combining the results of keyword tests against the database.

It is still a further object of the present invention to analyze data records in a database by efficiently representing the results of field type tests against the database.

It is still a further object of the present invention to analyze data records in a database by efficiently combining the results of field type tests against the database.

SUMMARY OF THE INVENTION

The present invention provides a method and apparatus for analyzing a database. This analysis is achieved by representing the subdocument lists of an inverted database with encoded bit strings. The encoded bit strings are space efficient methods of storing the correspondence between terms in the database and their occurrence in subdocuments. Logical combinations of these bit strings are then obtained by identifying the intersection, union, and/or inversion of a plurality of the bit strings. Since keywords for a database search can be identified by selecting the terms of the inverted database, the logical combinations of bit strings represent search results over the database. This technique for generating a search result is computationally efficient because computers combine bit strings very efficiently. The search elements of the present invention are not just limited to keywords. The search elements could also involve types of fields (e.g., date or integer fields) or other extracted entities. These and other aspects and advantages of the present invention will become better understood with reference to the following description, drawings, and appended claims.

BRIEF DESCRIPTION OF THE DRAWINGS

The invention will be described in detail with reference to the following drawings in which like reference numerals refer to like elements and wherein:

FIG. 3 is a flowchart that illustrates a process for searching a database according to the present invention.

FIG. 4 is an illustration of combining bit strings.

DETAILED DESCRIPTION OF THE INVENTION

Figure 1:
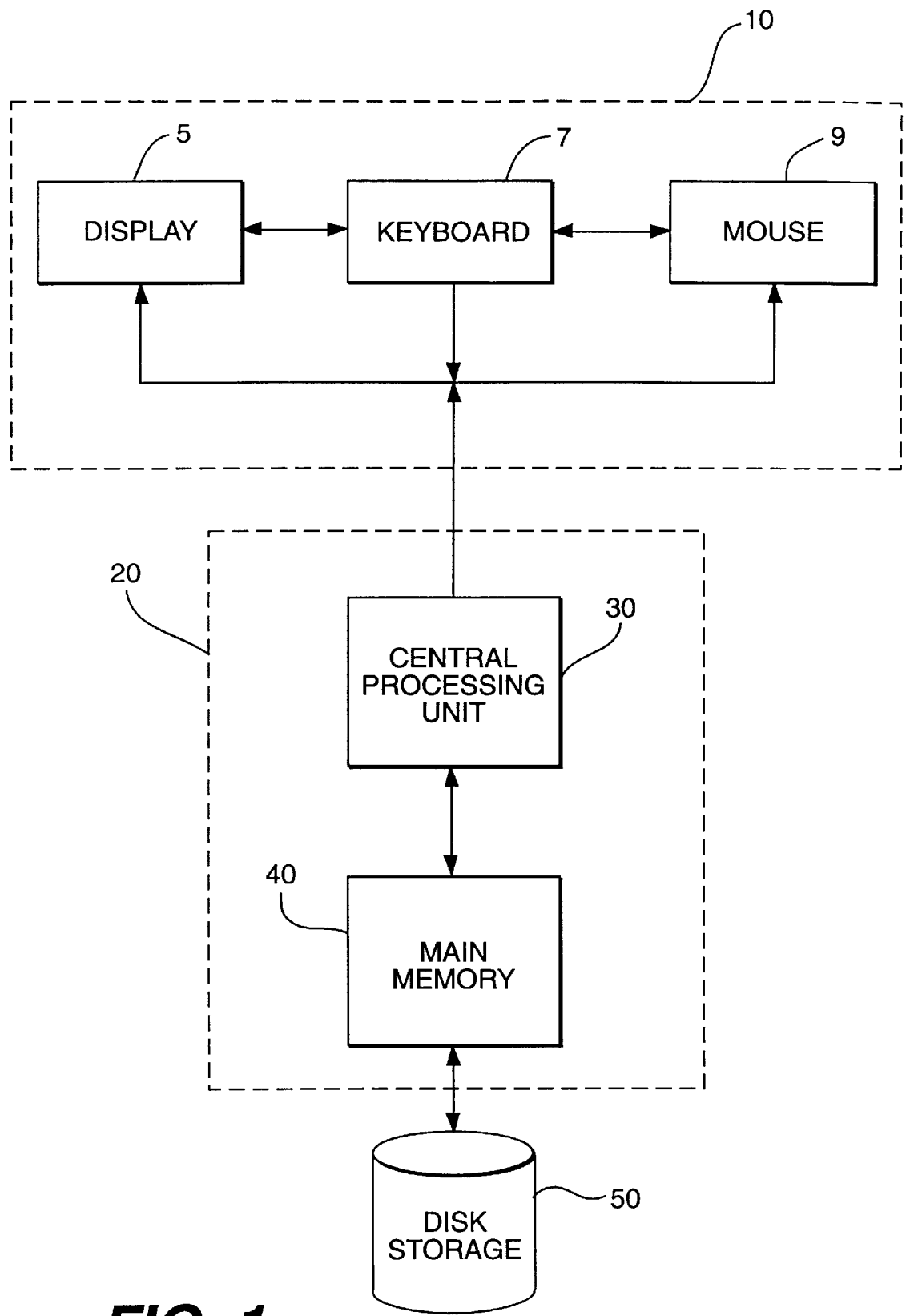
FIG. 1 is an illustration of a computer system for searching a database according to the present invention.

FIG. 1 illustrates a computer system for searching databases. The computer 20 consists of a central processing unit (CPU) 30 and main memory 40. The computer 20 is coupled to an Input/Output (I/O) System 10 that includes a display 5, a keyboard 7 and mouse 9. The computer 20 interacts with a disk storage unit 50 and the I/O system 10 to search databases that are stored on the disk storage unit 50. The results of those searches are displayed to the user, or alternatively, used by computer 20 for further processing of the information in the database.

Figure 2:
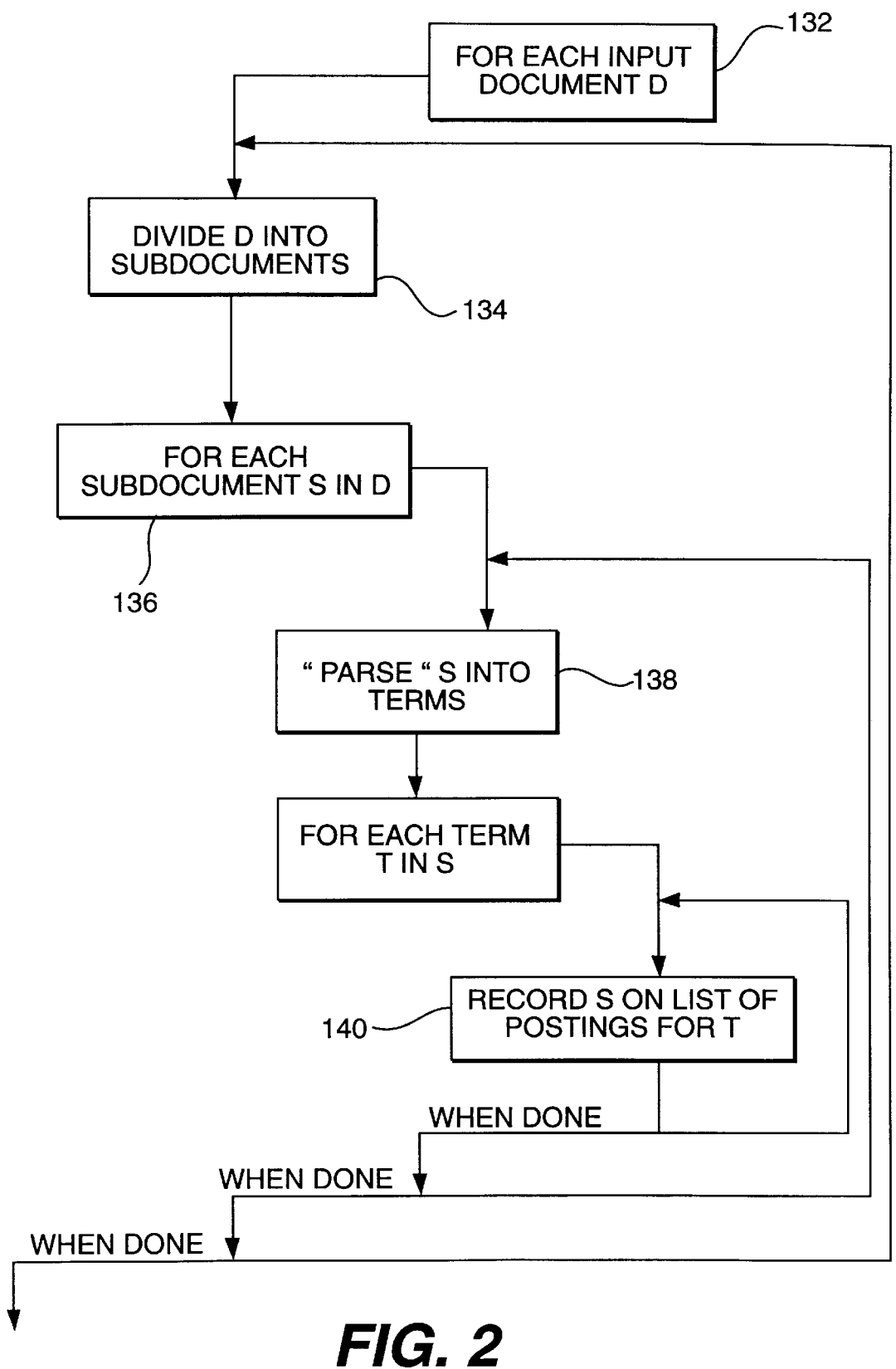
FIG. 2 is a flowchart that illustrates a process for inverting a database.

According to the present invention, the database that is stored in disk storage unit 50 is inverted. In general, an inverted database is a listing of all the terms of the database and the regions of text associated with those terms. FIG. 2 illustrates a process for operating a computer system to invert a database. In step 132, the computer 20 selects a document from the database in disk storage unit 50. In step 134, the document is divided into subdocuments. In this process, for example, the computer 20 detects paragraph boundaries in the document and creates subdocuments that generally correspond to the paragraphs in the document. Long paragraphs may consist of multiple subdocuments and several short paragraphs may be included in a single subdocument. The subdocuments all have approximately the same length. Furthermore, each subdocument is assigned a numerical identifier that identifies its location in the database.

In steps 136 and 138 of FIG. 2 respectively, a subdocument is then selected and parsed by the computer 20. Parsing a subdocument generally involves listing the terms in the subdocument. In this embodiment of the present invention, the parsing process is accomplished by assigning linguistic structure to sequences of words in a sentence and listing those terms or noun phrases of the subdocument that have semantic meaning. The parsing process can be implemented by a variety of techniques known in the art such as the use of lexicons, morphological analyzers or language grammar structures.

Once a subdocument has been parsed, step 140 generates a term list associating subdocument terms (including noun phrases) and the corresponding subdocument identifiers in which the terms occur. All the subdocuments for each document of the database are processed in this way and the list of terms and subdocuments is updated. Finally, all the documents of a database are processed according to steps 132–140. The result of this inversion process is a term list identifying all the terms (including noun phrases in this example) of a database and the identity of the subdocuments in which the terms occur.

In this embodiment of the present invention, each list of subdocuments associated with a term in the inverted database is represented and stored by a technique known as run length encoding. This approach recognizes that binary bit strings typically consist of repeated sets of bits of the same value (i.e., "1's" and "0's"), which can be encoded for later application. Using this technique, long binary bit strings that span millions of characters can be efficiently compressed into notably smaller bit strings.

In particular, the list of subdocuments of a database in which a term appears is represented by a series or bit string of 1's and 0's. Each subdocument is represented by a bit position in this bit string. When a '1' occurs in this bit string, its position indicates the particular subdocument in the database in which a term occurs. When a '0' occurs in this bit string, its position indicates that the term did not occur in that particular subdocument. A sample representation of subdocuments associated with a document in which a particular term appears might be "11111111110000000000000000000001111." In this bit string, the particular term appears in the first 10 subdocuments, it does not appear in the next 20 subdocuments and it appears in the next 4 subdocuments. A series of bit strings, wherein each bit represents a subdocument in the database, are then concatenated to represent the appearance of the particular term across the database.

Once the bit string for the entire database has been generated, this bit string is then compressed into a single code. For example, this code for the subdocument described above might be "$\{X_1, X_2, X_3\}$", wherein $X_1$ represents the sequence "1111111111", $X_2$ represents the sequence "00000000000000000000", and $X_3$ represents the sequence "1111". In this case, the variables used to compute each compressed code (i.e., $X_1$, $X_2$, $X_3$, etc.), are derived by denoting the number of "1's" followed by the number of "0's" in each run. According to this notation, the code $\{25,$ 3, 128, 14$\}$ could represent a sequence of twenty-five "1's", followed by three "0's", followed by one hundred and twenty-eight "1's", followed by fourteen "0's", and so on. Alternatively, each run of "1's" and "0's" in a given bit string could be encoded with a first indicator that identifies the polarity of the run as either a "1" or a "0" and a second indicator that identifies the total number of bits contained within the run. In this regard, each variable (i.e., $X_1$, $X_2$, $X_3$, etc.) would be a two-number designation in which the first number would be the binary value and the second number would be the length of the run for each of those values, such as $\{1,25; 0,3; 1,128; 0,14\}$.

The inverted database in which the subdocument list associated with each term is represented by a run length encoding is stored in disk storage unit 50 and is operated on by the computer 20 to perform a search. FIG. 3 is a flowchart that illustrates the search process. Initially in step 10, the computer 20 selects the inverted database (from among several that may be stored on disk storage unit 50) to be searched. The selection is normally made by a user input to the computer 20. Alternatively the selection could be made by the computer 20 based on predefined selected criteria. Once the database has been selected in step 10, a query is created in step 20 and sent to computer 20. This query is created in a variety of conventional ways such as by a user typing the query on the keyboard or by highlighting text from a document. The computer 20 the parses the query into a series of keywords joined by Boolean logic operators.

Once the query is parsed, the computer 20 performs step 30 in which the compressed bit strings for each term in the query are retrieved. In this step the computer 20 also reduces the logical combination of query keywords into a combination of union, intersection and inversion operations for the compressed bit strings. For example, if the query called for the Exclusive OR of the terms A and B (i.e., retrieve the documents having A or B but not those documents having A and B), then the set operators that are combined to create this search result is: (A intersect (inversion of B)) union (B intersect (inversion of A)). The set operators union, intersection and inversion can be combined to create any Boolean logic operation. As a result, any search request can be executed by combining these set operations on the encoded bit strings representing the occurrence of terms in the database.

FIG. 4 illustrates the combination of compressed bit strings for union and intersection. The individual bit strings for Query Term A 32 and Query Term B 34 are illustrated by a solid line representing '1's and a blank representing '0's. The shaded area in the intersection 36 and union 38 of A and B represents a '1'. Although not shown in FIG. 3, the Inversion operator is simply accomplished by changing the polarity of each bit in the string.

Figure 5:
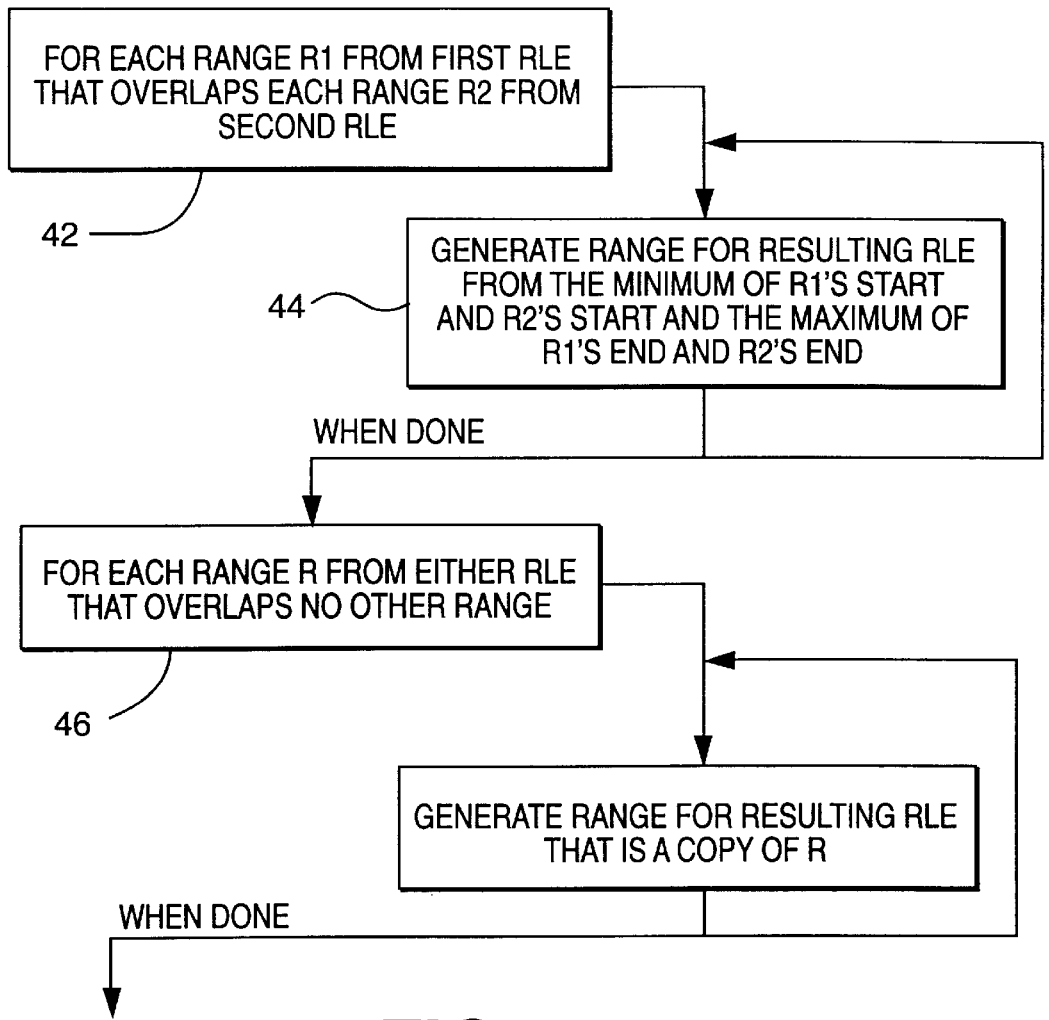
FIG. 5 is a flowchart that illustrates a process for the union combination of bit strings according to the present invention.

FIG. 5 illustrates a process for evaluating the union of sets represented by run length encoded (RLE) bit strings. Initially in Step 42 the overlapping range from a first and second RLE is determined. In addition to the range of step 42, steps 44 adds ranges from the minimum of the first or second overlapping RLE and adds range from the maximum of the first or second overlapping RLE. Finally in Step 46 range is added when either RLE has non overlapping range in the other RLE.

Figure 6:
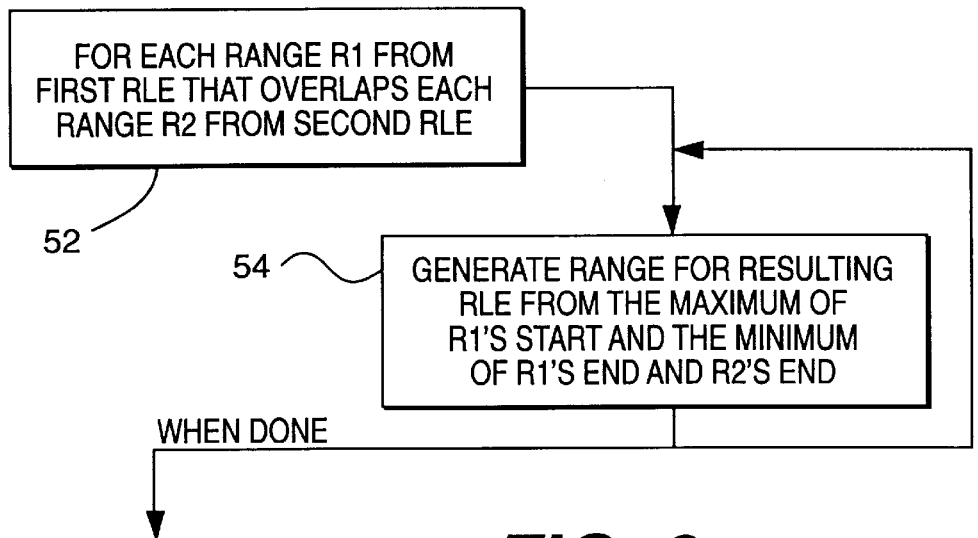
FIG. 6 is a flowchart that illustrates a process for the intersection combination of bit strings according to the present invention.

FIG. 6 illustrates the process for evaluating the intersection of RLEs. In Step 52, overlapping RLEs are determined. In Step 54, range is generated from the maximum start of the first or second RLE until the minimum end of the first or second RLE. The combinations of the RLE bit strings shown in FIGS. 3–5 can of course be performed on any number (2 or greater) of RLE bit strings. This is database can because a database can be preprocessed to determine bit strings for many elements. When search results are required for any combination of the preprocessed elements, the RLE bit strings can be combined and the search result for the combination of elements is quickly generated.

The process of operating the computer on the inverted and encoded database as illustrated in FIGS. 2–6 is efficient in generating search results over large databases. This is because, generally, there are four major operators for manipulating sets. They are: union, intersection, inversion and testing for the existence of an element in the set. The use of run length encoding allows the computer to perform the operations of union, intersection and inversion efficiently. The set operation of testing for an element over the database does not need to be performed in responding to a query because that step has effectively been done when the database was inverted and encoded. As a result the process of the present invention generates results for database queries quickly and efficiently.

The process of the present invention is not only useful for generating search results on Boolean combinations of keywords but it is also useful to efficiently generate search results on any Boolean combination of elements in a database. In particular, these elements can be types of fields or combinations of words. This is because the terms and their associated bit strings associated with terms can be categorized into types. For example, all dates can be combined and represented by a date field bit string. The search elements could also involve other extracted entities such as names, places, or relationships (such as a buyer in an acquisition). Database records can also be evaluated for the presence or absence of a sentences, characters, non-text objects (e.g., icons, pictures, sound representations), other types of fields or bit sequences of any sort. A combination of RLE bit strings associated with these elements, and hence a search result, is efficiently generated by this embodiment of the present invention.

Although the present invention has been described and illustrated in detail with reference to certain preferred embodiments thereof, other versions are possible. Upon reading the above description, it will become apparent to persons skilled in the art how to make changes in form or detail without departing from the substance of the invention.

I claim:

1. A method for generating a database search result, comprising:
   creating a plurality of subdocuments of approximately equal length from said database;
   representing the occurrence of a plurality of terms in each of said subdocuments by an encoded bit string;
   combining a plurality of said bit strings, wherein said combination represents a search result from said database.

2. The method of claim 1, further comprising generating a comparison list indicating the relation between a first encoded bit string and a second encoded bit string.

3. The method of claim 2, wherein said comparison list indicates the intersection between said first and said second encoded bit strings.

4. The method of claim 2, wherein said comparison list indicates the union between said first and said second encoded bit strings.

5. An apparatus for generating a database search result, comprising:
   a computer coupled to a disk storage unit, said disk storage unit stores a database, said computer creates a plurality of subdocuments of approximately equal length from said database;
   said computer represents the occurrence of a plurality of terms in each of said subdocuments by an encoded bit string; and
   said computer combines a plurality of said encoded bit strings, wherein said combination represents a search result from said database.

6. The apparatus of claim 5, wherein said processor further generates a comparison list that indicates the relation between a first and a second encoded bit string.

7. The apparatus of claim 5, wherein said comparison list indicates the intersection between said first and said second encoded bit string.

8. The apparatus of claim 5, wherein said comparison list indicates the union between said first and said second encoded bit string.

* * * * *

UNITED STATES PATENT AND TRADEMARK OFFICE
CERTIFICATE OF CORRECTION

PATENT NO. : 5,893,094
DATED : April 6, 1999
INVENTOR(S) : Michael L. Horowitz

It is certified that error appears in the above-identified patent and that said Letters Patent is hereby corrected as shown below:

Column 5, line 2, delete "database can", and insert --significant--.

Signed and Sealed this

Seventh Day of September, 1999

Attest:

Q. TODD DICKINSON

Attesting Officer

Acting Commissioner of Patents and Trademarks